United States Patent
Hawkinson

(10) Patent No.: US 7,421,343 B2
(45) Date of Patent: Sep. 2, 2008

(54) SYSTEMS AND METHODS FOR REDUCING VIBRATION-INDUCED ERRORS IN INERTIAL SENSORS

(75) Inventor: Wesley J. Hawkinson, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/163,695

(22) Filed: Oct. 27, 2005

(65) Prior Publication Data

US 2007/0100550 A1    May 3, 2007

(51) Int. Cl.
    *G01C 21/00* (2006.01)
(52) U.S. Cl. ............... 701/220; 701/110; 701/221; 244/173.2; 702/56; 702/116
(58) Field of Classification Search ............... 701/220, 701/110; 244/173.2; 702/103, 104, 105, 702/56, 106, 116
    See application file for complete search history.

(56) References Cited

U.S. PATENT DOCUMENTS

| | | | |
|---|---|---|---|
| 6,409,687 B1 * | 6/2002 | Foxlin ............... | 600/595 |
| 6,415,223 B1 * | 7/2002 | Lin et al. ............... | 701/208 |
| 6,421,622 B1 * | 7/2002 | Horton et al. ............... | 702/95 |
| 6,477,465 B1 * | 11/2002 | McCall et al. ............... | 701/220 |
| 6,498,996 B1 * | 12/2002 | Vallot ............... | 702/104 |
| 6,714,870 B1 * | 3/2004 | Weston et al. ............... | 702/9 |
| 6,738,714 B2 * | 5/2004 | McCall et al. ............... | 701/220 |
| 6,826,478 B2 | 11/2004 | Riewe et al. | |
| 6,829,524 B2 | 12/2004 | Chee | |
| 6,853,315 B2 * | 2/2005 | Schiller et al. ............... | 340/974 |
| 6,853,947 B1 * | 2/2005 | Horton ............... | 702/151 |
| 6,859,727 B2 | 2/2005 | Bye et al. | |
| 6,918,186 B2 * | 7/2005 | Ash et al. ............... | 33/313 |
| 2003/0137433 A1 * | 7/2003 | Schiller et al. ............... | 340/973 |
| 2003/0176970 A1 * | 9/2003 | Lin ............... | 701/214 |

(Continued)

FOREIGN PATENT DOCUMENTS

WO    2005075939    8/2005

OTHER PUBLICATIONS

Lund et. al. U.S. Appl. No. 60/666,256.*

(Continued)

*Primary Examiner*—Khoi H. Tran
*Assistant Examiner*—Jorge O Peche
(74) *Attorney, Agent, or Firm*—Fogg & Powers LLC; Gregory M. Taylor

(57) ABSTRACT

Systems and methods for reducing vibration-induced bias errors in inertial sensors are disclosed. A system for reducing bias errors in an inertial sensor operating within an environment may include a vibration detector for sensing vibration changes within the environment proximate to the inertial sensor, and a Kalman filter for computing an estimate of the navigational error produced by the inertial sensor due to a vibration-induced bias shift detected by the vibration detector. The vibration detector can be configured to measure an accelerometer output of the inertial sensor over a Kalman filter cycle, and then use the standard deviation of such output to obtain a statistical measure of the vibration within the environment. In some embodiments, the inertial sensor may include an inertial measurement unit (IMU) connected to an error compensation unit and strapdown navigator, each of which can be fed navigation corrections determined by the Kalman filter.

20 Claims, 3 Drawing Sheets

U.S. PATENT DOCUMENTS

2006/0100781 A1* 5/2006 Lin et al. .................... 701/216
2006/0224321 A1* 10/2006 Lund et al. .................. 701/220
2006/0287824 A1* 12/2006 Lin ............................ 701/214

OTHER PUBLICATIONS

Welch et al., "An introduction to Kalman Filter," pp. 1-16, Apr. 5, 2004.

* cited by examiner

SYSTEMS AND METHODS FOR REDUCING VIBRATION-INDUCED ERRORS IN INERTIAL SENSORS

GOVERNMENT SUPPORT

This invention was made with government support under DARPA contract number MDA972-01-9-0018. The government may have certain rights in the invention.

FIELD

The present invention relates generally to the field of inertial sensors. More specifically, the present invention pertains to systems and methods for reducing vibration-induced bias errors in inertial sensors.

BACKGROUND

Inertial sensors such as gyroscopes and accelerometers are used in a variety of applications for detecting and measuring inertial motion in one or more directions. In the design of some inertial navigation systems (INS), for example, such devices are used in sensing slight variations in linear and rotational motion of an object traveling through space. Typically, such motion is sensed by detecting and measuring displacement of a resonating structure such as a number of cantilevered beams or interdigitated comb fingers. In an inertial sensor employing a MEMS-type gyroscope and accelerometer, for example, a number of oscillating proof masses can be used to sense displacement and acceleration in response to movement of the device about an input or "rate" axis. In some designs, one or more of the gyroscopes and/or accelerometers can be provided as a part of an inertial measurement unit (IMU) that can be used to measure inertial motion and acceleration in multiple directions.

Inertial sensors are often used in environments that inherently subject the sensors to significant vibrations. When provided on aircraft and weapons, for example, significant vibration-induced bias errors can occur as a result of the constantly changing vibratory environment, affecting the sensor's ability to detect and measure subtle changes in motion. Such environments are especially problematic in those systems employing microelectromechanical (MEMS) sensors, which typically utilize vibratory mechanisms for rate and acceleration sensing. In a commonly used MEMS resonant beam accelerometer having a nominally one mili-g accuracy, for example, the presence of a constantly changing vibratory environment may produce bias shifts on the order of several mili-g's. For those inertial sensors exhibiting vibration sensitivity, the most common effect is a slowly varying low frequency error component that changes as a function of the applied vibration spectrum. Other errors may be present, however, depending on the application.

To overcome bias shifts resulting from vibration changes in the environment, many inertial sensors employ a sensor model and calibration process that is independent of the actual operating environment. In the case of an inertially guided weapon launched from an aircraft equipped with an inertial navigation system (INS), for example, an in-flight transfer alignment and calibration procedure is typically performed prior to release of the weapon. During this period, velocity differences (or related quantities) between the aircraft INS and the weapon INS may be processed by a Kalman filter to initialize the attitude and heading of the weapon INS, and to estimate errors in the IMU including any gyroscope and/or accelerometer bias errors. The vibration spectrum present at the weapon IMU is strongly driven by its captive-carry environment, such as a wing-store station or weapon bay. During the captive carry, the weapon's inertial sensor bias errors will be affected by the vibration environment. However, after release of the weapon, a significantly different vibration environment will typically exist, leading to gyroscope and accelerometer bias shifts that can cause vibration-induced errors in the sensor output. In some situations, other vibratory and non-vibratory related factors can also lead to such bias shifts in the sensor. Depending on the magnitude of these bias shifts, such change can negate any benefit of the pre-launch weapon IMU calibration.

SUMMARY

The present invention relates generally to systems and methods for reducing vibration-induced bias errors in inertial sensors. An illustrative system for reducing bias errors in an inertial sensor may include a vibration detector for sensing vibration changes within the environment proximate to the inertial sensor, and a Kalman filter for computing an estimate of the navigational error produced by the inertial sensor due to a vibration-induced bias shift detected by the vibration detector. The vibration detector can be configured to measure an accelerometer output of the inertial sensor over a Kalman filter cycle, and then use the standard deviation of such accelerometer output to obtain a statistical measure of the vibration within the environment. In certain embodiments, the inertial sensor may comprise an inertial measurement unit (IMU) capable of detecting and sensing inertial motion of the object about several orthogonal rate axes. An error compensation unit and a strapdown navigator operatively connected to the IMU can be configured to receive a navigation correction signal from the Kalman filter that can be used to compensate for any vibration-induced bias shifts in the IMU.

An illustrative method of reducing vibration-induced bias errors in an inertial sensor may include the steps of sensing inertial data of an object moving within an environment, detecting any vibration induced bias shifts in the inertial sensor using a vibration detector adapted to sense vibration changes within the environment proximate to the inertial sensor, outputting a bias shift signal to a Kalman filter adapted to compute an estimate of any navigational error, and then reducing any vibration-induced bias error in the inertial data based at least in part on the estimated navigational error outputted by the Kalman filter. Other methods and techniques are further described herein.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of operational steps and parameters are illustrated in the various views, those skilled in the art will recognize that many of the examples provided have suitable alternatives that can be utilized. Moreover, while the use of an inertial measurement unit (IMU) is specifically shown, it should be understood that the systems and methods described herein could be used for error compensation in other types of inertial sensors as well as other devices exhibiting a sensitivity to vibration.

Figure 1:
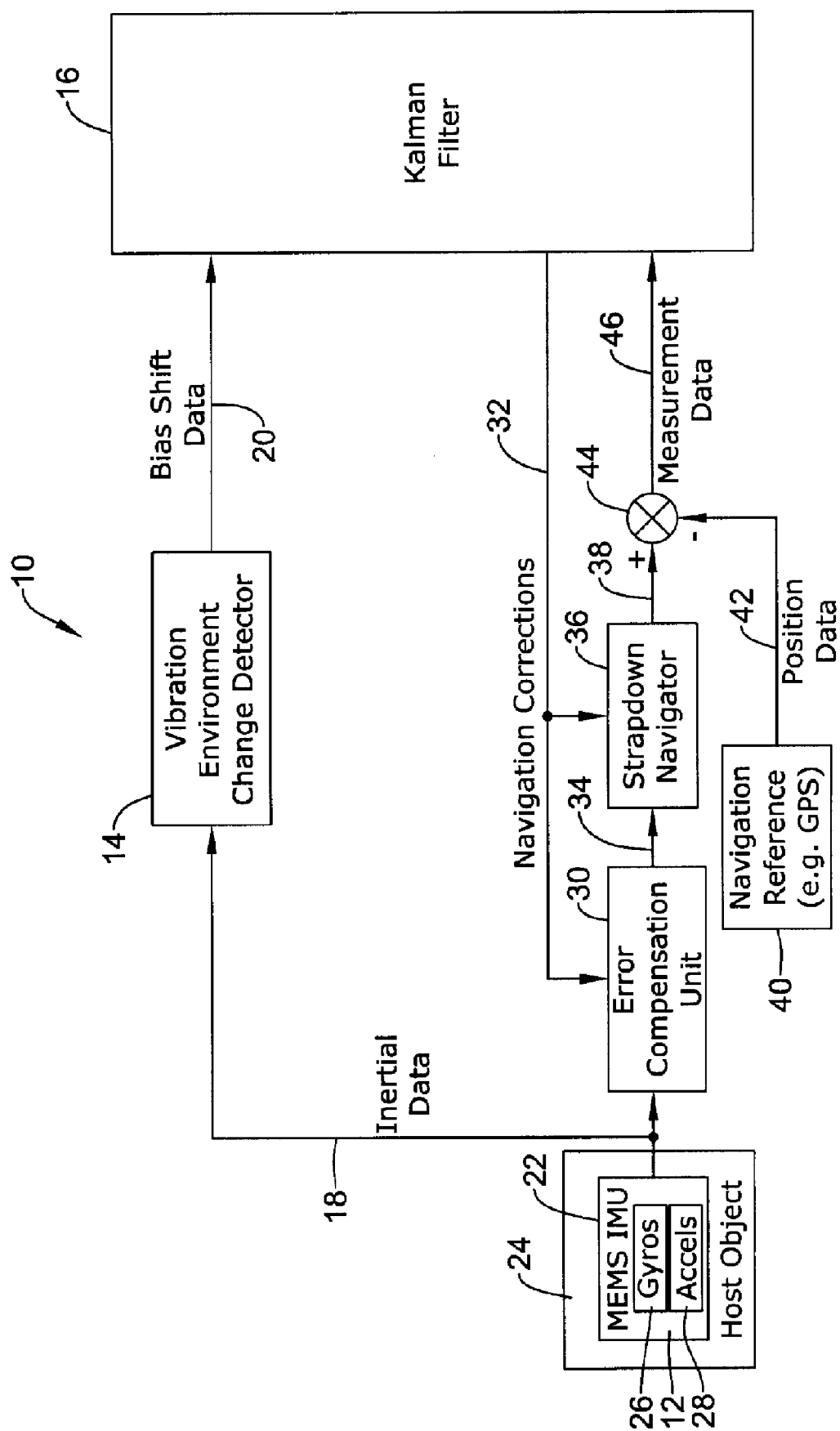
FIG. 1 is a block diagram showing an illustrative system for reducing vibration-induced bias errors in an inertial sensor.

FIG. 1 is a block diagram showing an illustrative system for reducing vibration-induced bias errors in an inertial sensor. The system, indicated generally by reference number 10 in FIG. 1, may include an inertial sensor 12, a vibration detector 14 adapted to sense vibration changes within the environment proximate to the inertial sensor 12, and a Kalman filter 16 including a recursive algorithm adapted to compute an estimate of the navigational error produced by the inertial sensor 12 based at least in part on inertial data 18 sensed by the inertial sensor 12 as well as a bias shift signal 20 outputted by the vibration detector 14.

The inertial sensor 12 may be housed within a sensor package 22, and can be configured to sense rotational motion of a host object 24 in one or more dimensions. In certain embodiments, for example, the inertial sensor 12 may comprise an inertial measurement unit (IMU) having a number of gyroscopes 26 for detecting and sensing inertial motion of the object about several orthogonal rate axes. The gyroscopes 26 may comprise, for example, three Coriolis-force gyroscopes adapted to sense angular rotation of the sensor package or housing 22 about three orthogonal rate axes, the output of which can be used to determine an X-axis rate component, a Y-axis rate component, and a Z-axis rate component of the host object 24 motion. A number of accelerometers 28, in turn, can be provided to measure acceleration of the host object 24 in one or more dimensions, if desired. The accelerometers 28 may include, for example, a number of cantilevered beams that can be used to sense acceleration along each of three orthogonal rate axes. While the inertial sensor 12 will typically include multiple gyroscopes 26 and accelerometers 28 for sensing motion and acceleration in multiple dimensions, it should be understood that the inertial sensor 12 could include a single gyroscope and accelerometer for sensing angular rate and acceleration data in only a single direction, if desired.

The vibration detector 14 can be configured to sense vibration changes within the environment proximate to the inertial sensor 12, and then output a bias shift signal 20 containing information about any vibration-induced bias shift in the inertial sensor 12. In those embodiments in which the inertial data 18 includes an acceleration output from one or more accelerometers 28, the vibration detector 14 can be configured to measure the accelerometer output over a Kalman filter cycle, and then use the standard deviation of such accelerometer output to statistically measure any changes in vibration occurring within the environment. If, for example, the accelerometer 28 output spectrum changes during the course of a Kalman filter cycle, thus indicating a change in vibration within the surrounding environment, the vibration detector 14 can statistically determine the deviation or variation of such change against other measured values by taking the standard deviation of the accelerometer 28 output. Such statistical analysis may be conducted, for example, using a processor or other suitable computational means equipped with a storage unit (e.g. a RAM, flash memory, etc.) for storing accelerometer 28 output data over time.

In addition to sensing vibration changes within the environment, the vibration detector 14 may also be capable of detecting other parameters or characteristics that can be used to compensate for vibration-induced bias errors in the inertial sensor 12. In certain embodiments, for example, the vibration detector 14 can include a temperature sensor that can be used to measure the temperature of the inertial sensor 12 in those cases where the sensor 12 exhibits temperature-dependent vibrational sensitivity. The output from the temperature sensor can then be used by the system 10 to compensate for any temperature-dependent bias errors in the inertial data 18 outputted by inertial sensor 12. If desired, the vibration detector 14 may also employ other types of sensors for sensing other parameters and/or characteristics within the surrounding environment that may affect the performance of the inertial sensor 12.

An error compensation unit 30 operatively connected to the inertial sensor 12 can be used to provide error compensation for the inertial data 18 outputted by the inertial sensor 12, including any vibration-induced bias shifts detected. As indicated generally by arrow 32, the error compensation unit 30 can be configured to receive a navigation correction signal outputted by the Kalman filter 16, which as described in greater detail below with respect to FIG. 2, contains various navigation corrections based at least in part on the bias shift signal 20 outputted from the vibration detector 14. In some embodiments, the error compensation unit 30 can be configured to run an algorithm or routine that compensates for any errors in the inertial data 18 using a correction matrix containing various coefficients for reducing bias errors in the inertial sensor 12, including any vibration-induced bias errors in the gyroscopes 26 and accelerometers 28 due to vibration of the host object 24. The error compensation unit 30 may also contain correction coefficients for compensating various other errors in the inertial sensor 12, including, for example, any temperature dependent errors affecting the vibrational sensitivity of the inertial sensor 12.

The error-compensated inertial data 34 outputted by the error compensation unit 30 can be fed to a strapdown navigator 36, which can be configured to integrate the angular rate output from the gyroscopes 26 and from the accelerometers 28 to output a position signal 38 containing a measurement of the heading and level attitude (e.g. pitch and roll). The position signal 38 may include, for example, the path heading, distance traveled, velocity output, and the attitude describing the orientation of the host object 24 in space. The strapdown navigator 36 can also provide various state and dynamics information to the Kalman filter 16, including confidence intervals or the like describing the accuracy of the inertial sensor 12. It should be understood, however, that different outputs may be determined and provided by the error compensation unit 30 and strapdown navigator 36, if desired.

In certain embodiments, a navigation reference 40 such as a global positioning system (GPS) reference may be further implemented to provide accurate measurements of position and/or velocity (or equivalently, pseudorange and/or deltarange for a plurality of GPS satellites). The position data 42 provided by the navigational reference 40 can be used to detect and quantify any position and/or velocity errors of the navigational solution resulting from the effects of host object 24 vibration on the gyroscopes 26 and accelerometers 28. While GPS position data 42 is provided in the illustrative embodiment of FIG. 1, it should be understood that other types of position data 42 may also be used, including but not limited to, data from a differential GPS, ultrasonic or RF positioning systems, or other suitable positioning system.

A comparator 44 can be utilized to difference the position data 42 from the navigational reference 40 with the position signal 38 computed and outputted by the strapdown navigator 36 to obtain a measurement signal 46 indicative of the position and/or attitude errors of the inertial sensor 12.

The Kalman filter 16 may employ a recursive algorithm or routine that accepts changes in vibration detected by the vibration detector 14, and then outputs a navigation correction signal 32 that can be used, if necessary, to compensate for any vibration-induced bias shifts in the inertial data 18 outputted by the inertial sensor 12. The navigation correction signal 32 may be in the form of state corrections that can be used by the error compensation unit 30 and/or the strapdown navigator 36 to construct a navigation solution that incorporates actual vibration changes in the environment rather than relying on modeled solutions and/or on calibration procedures in different environments. In use, the ability of the system 10 to compensate for vibration-induced bias shifts in the inertial sensor 12 using actual vibration changes sensed within the environment reduces modeling errors that can result from operation of the sensor in an environment different from the modeled environment.

Figure 2:
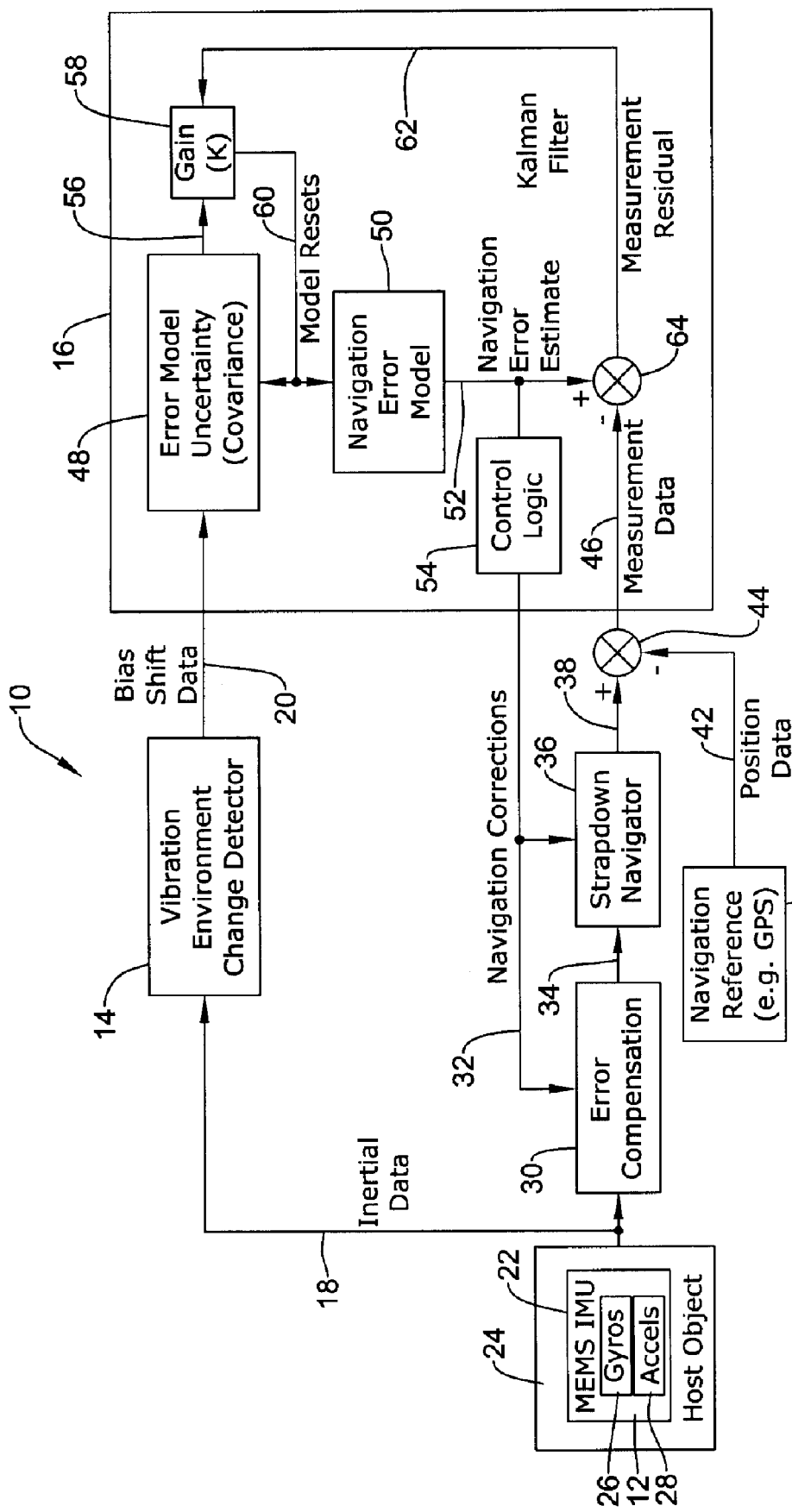
FIG. 2 is another block diagram of the illustrative system of FIG. 1, showing the structure of the Kalman filter in greater detail.

FIG. 2 is another block diagram of the illustrative system 10 of FIG. 1, showing the structure of the Kalman filter 16 in greater detail. As shown in FIG. 2, the bias shift signal 20 containing vibration change data within the environment indicative of a sensor bias shift can be fed to an error model uncertainty component 48 of the Kalman filter 16, which computes a process noise covariance "Q" and a measurement noise covariance "R" that can be used by a Kalman gain component "K" 58 for compensation. A navigation error model 50 of the Kalman filter 16 can be configured to predict a navigation error estimate 52 that can be compared 64 with the measurement data 46 to form a measurement residual 62. The measurement residual 62 thus reflects the discrepancy between the navigational error estimates 52 produced by the navigation error model 50 and the actual measurement data 46 taken from the inertial sensor 12. A measurement residual 62 of zero, for example, means that the predicted and actual measurements are the same. Conversely, a measurement residual 62 different than zero indicates that there is a discrepancy between the predicted and actual measurements.

The measurement residual 62 can be applied to the gain component 58 to form the model resets 60 of the Kalman filter 16. In some embodiments, and as shown in FIG. 2, the model resets 60 can be applied to the navigation error model 50 and error model uncertainty 48 to modify the Kalman filter's estimate of the navigational error and error model uncertainty. The navigation error estimates 52 produced by the navigation error model 50 can then be fed to various control logic 54, which outputs navigation corrections 32 to the error compensation unit 30 and strapdown navigator 36, as described above.

The weighting matrix employed by the gain component 58 may include coefficients that weigh the measurement residual 62 by different amounts depending on whether the measurement error covariance approaches zero or not. If, for example, the error model uncertainty 48 approaches zero, the gain component 58 may weigh the measurement residual 62 less heavily, thus indicating a greater level of confidence that the navigation error model 50 is correct. On the other hand, if the process error model uncertainty 48 is large, the gain component 58 may weigh the measurement residual 62 more heavily, thus indicating a decreased level of confidence that the navigation error model 50 is correct. The navigational error estimate 52 outputted by the navigation error model 50 will typically vary based on the confidence afforded to either the predicted or updated measurements vis-à-vis the gain component 58, allowing the Kalman filter 16 to provide navigation corrections 32 to the error compensation unit 30 and strapdown navigator 36 that more accurately reflect the actual operating conditions of the inertial sensor 12.

In some embodiments, the error model uncertainty component 48 may be implemented by a covariance matrix, whose time propagation step in a standard Kalman filter algorithm may be expressed generally as:

$$\tilde{P}=\Phi\hat{P}\Phi^T+GQG^T \qquad (1)$$

where:
  "P" is the covariance matrix;
  "Φ" is a state transition matrix;
  "Q" is a process noise density matrix; and
  "G" is a process noise dynamic coupling matrix.

In equation (1) above, the tilde ("~") and circumflex ("^") marks distinguish the values of the covariance matrix after and before the time update, respectively. The last term on the right-hand side of the equation (1) takes into account the effect of process noise on the growth of the covariance matrix over time. The process noise dynamic coupling matrix "G", in turn, can be used to account for correlations among the components of the noise driving the various elements of the error state.

Based on the above equation (1), the measurement update step of the standard Kalman filter algorithm may be expressed generally as:

$$\hat{P}=\tilde{P}-KH\tilde{P} \qquad (2)$$

and $$K=\tilde{P}H^T(H\tilde{P}H^T+R)^{-1} \qquad (3)$$

where:
  "K" is the Kalman gain matrix;
  "H" is a measurement sensitivity matrix; and
  "R" is the measurement error covariance matrix.

Again, the tilde and circumflex marks distinguish the values before and after the measurement update, respectively. The gain "K" is also used to update the estimate of the error state according to the following equation:

$$\hat{x}=\tilde{x}+K(\Delta y-H\tilde{x}) \qquad (4)$$

where:
  "Δy" denotes the measurement residual.

Relatively small values of "P" indicate that the uncertainty of the corresponding error states is small, and thus only small adjustments of the error state vector are necessary to reduce the total navigation error. Conversely, increasing values of "P" indicate an increasing uncertainty of corresponding error states, thus implying that a relatively larger portion of the navigational error is due to incorrectly estimated values of those error states.

The covariance matrix behavior associated with sensor bias states in a standard Kalman filter implementation is typically characterized by an initial large value, and, with appropriately processed measurements from the measurement data 46, a monotonic reduction over time to a relatively small value. Such behavior assumes that the sensor biases do not exhibit a significant change once they are initially estimated, which may not be the case in some systems that use sensors whose biases are sensitive to changing vibration environments. Thus, if the Kalman filter does not have accurate information as to the sources of the navigational errors, the performance of the navigational system may be degraded. In the case of a navigational system with changing biases, the Kalman filter 16 should therefore be informed that the likely cause of navigation error is due to sensor biases in order to more quickly reduce the error.

In one illustrative method, the Kalman filter 16 can be informed that an individual sensor bias has experienced a vibration-induced change by adjusting the "P" elements associated with that sensor bias error state vector element. If the bias shift data 20 is used to increase the value of the appropriate elements of "Q", the covariance matrix "P" elements will be adjusted accordingly, as described in equation (1) above. The adjusted "P" elements will thus alter the Kalman gain "K" 58 computation in equation (3), and when used with the measurement residual 62 to update the error state vector of equation (4), will result in a proportionally larger change of the sensor bias error states and effectively re-estimate the sensor biases, thus resulting in increased navigation performance.

Figure 3:
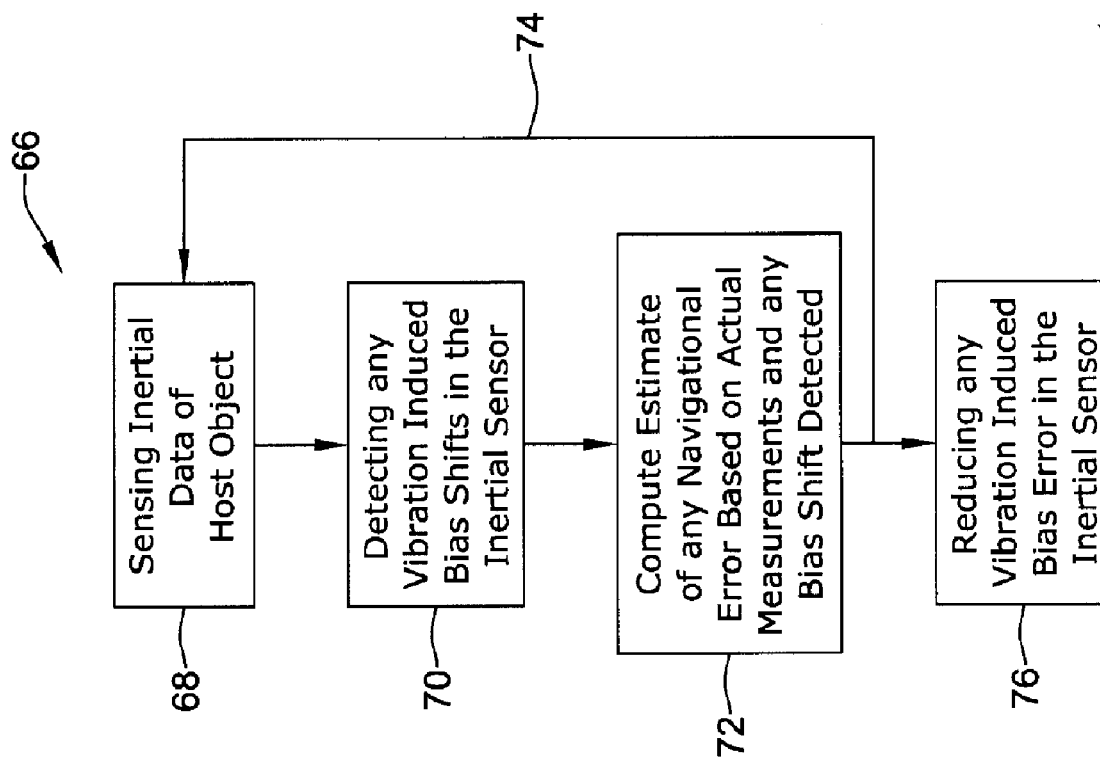
FIG. 3 is a flow chart showing an illustrative method of reducing vibration-induced bias errors in an inertial sensor.

Referring now to FIG. 3, a flow chart showing an illustrative method 66 of reducing vibration-induced errors in an inertial sensor will now be described. As shown in FIG. 3, the illustrative method 66 may begin with the step 68 of sensing inertial data of a host object using an inertial sensor. The inertial sensor may comprise, for example, an inertial measurement unit (IMU) such as that described above with respect to FIG. 1, including a number of gyroscopes and accelerometers for detecting and sensing velocity and acceleration of the host object about several orthogonal rate axes. Other types of inertial sensors may be used, however, depending on the application.

Once inertial data has been sensed by the inertial sensor, a vibration detector or other suitable means for detecting vibration within the environment proximate to the inertial sensor can then be used to detect any vibration-induced bias shifts in the inertial sensor, as indicated generally by reference number 70. The bias shift detection may occur, for example, by measuring an accelerometer output of the inertial sensor over a Kalman filter cycle, and then using the standard deviation of such accelerometer output as a statistical measure of the vibration within the environment. Other techniques could be employed, however, to stochastically measure the vibration within the environment, if desired.

Once the vibration detector detects a vibration-induced bias shift in the inertial sensor output, it may convert such data into a bias shift signal that can be fed to the Kalman filter to determine an estimate of any navigational error produced by the inertial sensor, as indicated generally by reference number 72. The Kalman filter can then be configured to compute an estimate of any navigation error in the sensor output based on actual measurements received from the inertial sensor as well as the bias shift signal outputted by the vibration detector. The steps of sensing 68 inertial data, detecting 70 any vibration-induced bias shifts in the inertial sensor, and computing 72 an estimate of any navigation error using the Kalman filter can then be repeated one or more times in order to estimate and, if necessary, compensate for any future vibration changes within the environment, as indicated generally by reference number 74. Using an estimate of the navigational error outputted by the Kalman filter during each filter cycle, an error compensation unit or other suitable means for error compensation can be employed to reduce any vibration-induced bias error in the inertial sensor, as indicated generally by reference number 76.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A system for reducing bias errors in an inertial sensor operating within an environment, the system comprising:
    an inertial sensor having an output;
    a vibration detector for sensing vibration changes within the environment proximate to the inertial sensor and operatively connected to the output of the inertial sensor, the vibration detector adapted for outputting a bias shift signal containing information of any vibration-induced bias shift in the inertial sensor;
    a Kalman filter for computing an estimate of the navigational error produced by the inertial sensor due to the vibration-induced bias shift, the Kalman filter having a first input, a second input, and an output, the first input of the Kalman filter directly connected to the output of the vibration detector, the output of the Kalman filter adapted for outputting a navigation correction based at least in part on actual measurement data from a comparator unit and from the bias shift signal outputted by the vibration detector;
    an error compensation unit having a first input, a second input, and an output, the first input of the error compensation unit directly connected to the output of the inertial sensor, the second input of the error compensation unit operatively connected to the output of the Kalman filter; and
    a strapdown navigator having a first input, a second input, and an output, the first input of the strapdown navigator operatively connected to the output of the error compensation unit, the second input of the strapdown navigator operatively connected to the output of the Kalman filter;
    wherein the comparator unit has a first input, a second input, and an output, the first input of the comparator unit operatively connected to the output of the strapdown navigator, the second input of the comparator unit operative to receive position data, and the output of the comparator unit operatively connected to the second input of the Kalman filter.

2. The system of claim 1, wherein said inertial sensor is an inertial measurement unit.

3. The system of claim 2, wherein the vibration detector is adapted to measure an accelerometer output of the inertial measurement unit over a Kalman filter cycle, and then use a standard deviation of said accelerometer output as a statistical measure of vibration within the environment.

4. The system of claim 2, wherein the error compensation unit is adapted to compensate for any vibration-induced bias errors in the inertial measurement unit based at least in part on the navigation correction outputted by the Kalman filter.

5. The system of claim 2, wherein the strapdown navigator is adapted to integrate an angular rate output from one or more gyroscopes and one or more accelerometers of the inertial measurement unit and output a position change signal containing a measure of heading and/or attitude.

6. The system of claim 5, further comprising a navigational reference for referencing the position change signal outputted by the strapdown navigator.

7. The system of claim 6, wherein said navigational reference includes data from a global positioning system.

8. The system of claim 1, further comprising temperature sensing means for measuring the temperature of the inertial sensor.

9. A system for reducing bias errors in an inertial sensor operating within an environment, the system comprising:

an inertial measurement unit having an output;
a vibration detector for sensing vibration changes within the environment proximate to the inertial measurement unit and operatively connected to the output of the inertial measurement unit, the vibration detector configured to measure an output signal from the inertial measurement unit and use a standard deviation of the output signal to statistically measure the vibration changes within the environment, the vibration detector adapted for outputting a bias shift signal containing information of any vibration-induced bias shift in the inertial measurement unit;
a Kalman filter for computing an estimate of the navigational error produced by the inertial measurement unit due to the vibration-induced bias shift, the Kalman filter having a first input, a second input, and an output, the first input of the Kalman filter directly connected to the output of the vibration detector, the output of the Kalman filter adapted for outputting a navigation correction based at least in part on actual measurement data from a comparator unit and from the bias shift signal outputted by the vibration detector;
an error compensation unit having a first input, a second input, and an output, the first input of the error compensation unit directly connected to the output of the inertial measurement unit, the second input of the error compensation unit operatively connected to the output of the Kalman filter; and
a strapdown navigator having a first input, a second input, and an output, the first input of the strapdown navigator operatively connected to the output of the error compensation unit, the second input of the strapdown navigator operatively connected to the output of the Kalman filter;
wherein the comparator unit has a first input, a second input, and an output, the first input of the comparator unit operatively connected to the output of the strapdown navigator, the second input of the comparator unit operative to receive position data, and the output of the comparator unit operatively connected to the second input of the Kalman filter.

10. The system of claim 9, wherein the vibration detector is adapted to measure an accelerometer output of the inertial measurement unit over a Kalman filter cycle, and then use the standard deviation of said accelerometer output as a statistical measure of the vibration within the environment.

11. The system of claim 9, wherein the error compensation unit is adapted to compensate for any vibration-induced bias errors in the inertial measurement unit based at least in part on the navigation correction outputted by the Kalman filter.

12. The system of claim 9, wherein the strapdown navigator is adapted to integrate an angular rate output from one or more gyroscopes and one or more accelerometers of the inertial measurement unit and output a position change signal containing a measure of heading and/or attitude.

13. The system of claim 12, further comprising a navigational reference for referencing the position change signal outputted by the strapdown navigator.

14. The system of claim 13, wherein said navigational reference includes data from a global positioning system.

15. The system of claim 9, further comprising temperature sensing means for measuring the temperature of the inertial measurement unit.

16. A system for reducing bias errors in an inertial sensor operating within an environment, the system comprising:
an inertial measurement unit having an output;
a vibration detector for sensing vibration changes within the environment proximate to the inertial measurement unit and operatively connected to the output of the inertial measurement unit, the vibration detector configured to measure an output signal from the inertial measurement unit and use a standard deviation of the output signal to statistically measure the vibration changes within the environment, the vibration detector adapted for outputting a bias shift signal containing information of any vibration-induced bias shift in the inertial measurement unit;
a Kalman filter for computing an estimate of the navigational error produced by the inertial measurement unit due to the vibration-induced bias shift, the Kalman filter having a first input, a second input, and an output, the first input of the Kalman filter directly connected to the output of the vibration detector, the output of the Kalman filter adapted for outputting a navigation correction based at least in part on actual measurement data from a comparator unit and from the bias shift signal outputted by the vibration detector;
an error compensation unit having a first input, a second input, and an output, the first input of the error compensation unit directly connected to the output of the inertial measurement unit, the second input of the error compensation unit operatively connected to the output of the Kalman filter, the error compensation unit adapted to compensate for the vibration-induced bias shift based at least in part on said navigation correction;
a strapdown navigator having a first input, a second input, and an output, the first input of the strapdown navigator operatively connected to the output of the error compensation unit, the second input of the strapdown navigator operatively connected to the output of the Kalman filter; and
a navigation reference for referencing a position change signal outputted by the strapdown navigator;
wherein the comparator unit has a first input, a second input, and an output, the first input of the comparator unit operatively connected to the output of the strapdown navigator, the second input of the comparator unit operative to receive position data from the navigation reference, and the output of the comparator unit operatively connected to the second input of the Kalman filter.

17. A method of reducing vibration-induced bias errors in an inertial sensor, the method comprising the steps of:
sensing inertial data of an object moving within an environment;
outputting an inertial data signal to a vibration detector and a first input of an error compensation unit both directly connected to the inertial sensor;
detecting any vibration-induced bias shifts in the inertial sensor using the vibration detector, the vibration detector adapted to sense vibration changes within the environment proximate to the inertial sensor by measuring the inertial data signal and using a standard deviation of the inertial data signal to statistically measure the vibration changes within the environment;
outputting a bias shift signal to a first input of a Kalman filter directly from the vibration detector, the Kalman filter adapted to compute an estimate of any navigational error produced by the inertial sensor based at least in part on actual measurement data from a comparator unit and from any vibration-induced bias shift detected by the vibration detector;
outputting an error-compensated inertial data signal from the error compensation unit to a first input of a strapdown navigator;

outputting a position signal from the strapdown navigator to a first input of the comparator unit;

sending a navigation reference signal to a second input of the comparator unit; and reducing any vibration-induced bias error in the inertial data based at least in part on the estimated navigational error outputted by the Kalman filter to a second input of the error compensation unit and a second input of the strapdown navigator.

18. The method of claim 17, wherein said inertial sensor is an inertial measurement unit.

19. The method of claim 17, wherein said step of detecting any vibration-induced bias shifts in the inertial sensor includes the steps of:

measuring an accelerometer output of the inertial sensor over a Kalman filter cycle; and using the standard deviation of said accelerometer output as a statistical measure of the vibration within the environment.

20. An inertial sensor system comprising:

an inertial measurement unit having an output;

a vibration detector having an input and an output, the input of the vibration detector directly connected to the output of the inertial measurement unit, the vibration detector configured to measure an output signal from the inertial measurement unit to statistically measure vibration changes within an environment proximate to the inertial measurement unit;

a Kalman filter having a first input, a second input, and an output, the first input of the Kalman filter directly connected to the output of the vibration detector, the output of the Kalman filter configured for outputting a navigation correction;

an error compensation unit having a first input, a second input, and an output, the first input of the error compensation unit directly connected to the output of the inertial measurement unit, the second input of the error compensation unit operatively connected to the output of the Kalman filter;

a strapdown navigator having a first input, a second input, and an output, the first input of the strapdown navigator operatively connected to the output of the error compensation unit, the second input of the strapdown navigator operatively connected to the output of the Kalman filter;

a navigation reference for referencing a position change signal outputted by the strapdown navigator; and a comparator unit having a first input, a second input, and an output, the first input of the comparator unit operatively connected to the output of the strapdown navigator, the second input of the comparator unit operatively connected to an output of the navigation reference, and the output of the comparator unit operatively connected to the second input of the Kalman filter.

* * * * *